2,881,071

PROCESSES FOR THE CONTROL OF SLIME-FORMING AND OTHER MICROORGANISMS AND COMPOSITIONS FOR USE THEREFOR

Stanley J. Buckman, Raleigh, and John D. Pera and John W. Appling, Memphis, Tenn., assignors to Buckman Laboratories, Inc., Memphis, Tenn., a corporation of Tennessee No Drawing. Application July 12, 1957
Serial No. 671,396

12 Claims. (Cl. 92—3)

The present invention relates to processes for the control of slime-forming and other microorganisms, particularly industrial processes involving water and substances that are normally susceptible to microbiological degradation or detioration in the presence of water, in which the growth and proliferation of such microorganisms interfere in the process itself or affect the quality or character of the resulting product, and includes microbicidal compositions for use therein.

The present application is a continuation-in-part of our prior copending application Serial No. 494,286, filed March 14, 1955. This application, together with the copending application of one of us (John D. Pera), Serial No. 617,278, filed October 22, 1956, which issued December 10, 1957, as Patent No. 2,816,136, replaces the said application Serial No. 494,286.

Many industrial products, when wet or when subjected to treatment in water, are normally susceptible to bacterial deterioration or degradation. Wood pulp, starch and proteinaceous substances, animal hides, vegetable tanning liquors and leather are all damaged or degraded by growth of bacteria and other microorganisms or by enzymes produced by such growth.

Slime consists of matted deposits of microorganisms, fibers and debris, and it may be stringy, pasty, rubbery, tapioca-like, hard or horny and it may have a characteristic odor that is quite unlike that of the liquid suspensions in which it is formed. The microorganisms involved in its formation are primarily different species of sporeforming and nonsporeforming bacteria, particularly capsulated forms of bacteria which secrete gelatinous substances that envelop or encase the cells. Slime microorganisms also include filamentous bacteria, filamentous fungi of the mold type, yeasts, and yeastlike organisms.

Besides being objectionable from the standpoint of general cleanliness and sanitation in breweries, wineries, dairies, paper and sugar mills, and other industrial plants or establishments, slime may interfere and produce plugging of screens in pulp and paper systems, thus reducing their efficiency. When large amounts of slime become incorporated in the paper sheet, its strength is reduced, and it may consequently break and require rethreading of the machine. In the paper itself, slime may be responsible for unsightly spots, holes, and odors and may produce general discoloration throughout the sheet.

Growth of microorganisms in industrial water supplies, for example, in reservoirs or basins, spray ponds, on heat exchangers or in cooling towers, may produce slime or other solid accumulations which may interfere with normal flow of the water or produce plugging or complete stoppage of the flow through pipes, or, in the case of heat-exchangers, reduce the rate of heat transfer.

In groundwood pulp, the presence of aerobic bacteria interferes with peroxide bleaching treatments to which such pulp may be subjected, since the enzyme catalase produced by such bacteria accelerates decomposition of the peroxide and thereby reduces its effectiveness in the treatment.

The desirability of controlling the growth of microorganisms for these and other purposes is apparent from the great number of toxicants or preservatives whose use for such purposes has heretofore been suggested. In such uses, the quantity of toxicant that is required, its cost, its effectiveness in any particular application, and its persistence or ease of removal from the finished product, as well as its continued effectiveness over long periods of use, are factors which must be considered. Traces of several toxicants which are used for these purposes are difficult to remove and impart their persistent and disagreeable odors to products with which they have been in contact. Many toxicants also are sensitive to changes in pH values of the media in which they are used and may lose activity or precipitate in pH ranges for which they are not adapted.

The principal object of the present invention is to provide processes for the control of microorganisms, particularly slime-forming microorganisms, in industrial processes involving water and organic substances such as pulp, that are normally susceptible to microbiological degradation or deterioration in the presence of water, in which the growth and proliferation of such microorganisms interfere in the process itself or affect the quality or character of the resulting product. It is also an object of the present invention to provide compositions which, when introduced into the water being used in such industrial processes, will control such microorganisms. Other objects and advantages of the invention, some of which are referred to hereinafter, will be obvious to those skilled in the art to which the invention pertains.

We have discovered that the water-soluble alkali and alkaline-earth-metal salts of cyanodithioimidocarbonic acid are bactericidal and they they are useful in preventing the formation of slime in pulp and paper mills and generally in preventing microbiological deterioration of a great variety of organic substances. They are effective for these purposes at very low concentrations. Besides controlling growth and proliferation of microorganisms, they are not absorbed on nor do they combine with groundwood or paper pulp and other organic substances, and when used in industrial processes for the treatment of such substances, they do not remain in or upon and consequently do not contaminate the resulting products.

Although the technical literature on cyanodithioimidocarbonic acid and its salts is confusing, and all questions of structure and chemistry of these compounds may not yet have been resolved, and since they have also been referred to by others as dithiocyanic acid and dithiocyanates, we have, for purposes of this description, adopted herein the terminology used by A. Hantzsch and M. Wolvekampf in their report entitled "The Constitution of the So-Called Dithiocyanic Acid and Perthiocyanic Acid," published in Annalen, vol. 331, pages 265–297 (1904), particularly page 283 et seq. In accordance with their report, the alkali-metal salts of cyanodithioimidocarbonic acid may be represented by the structural formula:

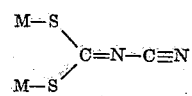

in which each M is an alkali-metal radical. These salts can be prepared from carbon disulfide, cyanamide, and an alkali-metal hydroxide, or from carbon disulfide and calcium or other metal salts of cyanamide, as described hereinafter in the examples and in the published report by A. Hantzsch and M. Wolvekampf. Other methods of preparation which may be used, including preparation from xanthane hydride (isoperthiocyanic acid), are also described in the said report. The preparation of water-soluble salts of cyanodithioimidocarbonic acid from carbon disulfide and calcium and other alkaline-earth-metal cyanamides, which is illustrated in Examples 3 and 4 herein, is claimed in and is the principal subject matter of the copending application (Serial No. 617,278, filed October 22, 1956) of one of us (John D. Pera), now Patent No. 2,816,136.

Since the compositions used in the practice of the processes of this invention include known compounds and solutions of known compounds, and consequently are not patentable per se, and are not specifically claimed as such, they will be referred to herein in a generic sense as the compositions of this invention for lack of a shorter or more apposite designation.

The alkali and alkaline-earth-metal salts of cyanodithioimidocarbonic acid, which are crystalline solids, may be used in the processes of the present invention in solid crystalline or particulate form or in admixture with other particulate solids, such as talc, fuller's earth, diatomaceous earth, hydrated calcium silicate, pyrophyllite, kaolin and other clays, which serve as carriers, or extenders, to provide dry particulate compositions that flow more freely and consequently facilitate the dispensing of dosage quantities of the compositions of this invention.

The compositions of the present invention are preferably and more advantageously dispensed, however, in the form of solutions, particularly concentrated aqueous solutions. Solutions may also be prepared in organic solvents and in mixtures of water and organic solvents, particularly polar water-miscible organic solvents, such as methanol, ethanol, isopropanol, acetone, and other lower ketones, glycols, such as ethylene glycol, diethylene glycol and hexylene glycol (2-methyl-2,4-pentanediol), and glycol ethers such as methyl Carbitol (2-(2-methoxyethoxy)ethanol), and methyl Cellosolve (2-methoxyethanol). Solutions in some of these organic solvents (methanol, ethanol, etc.) have lower freezing points than aqueous solutions containing equivalent amounts of the salts.

In dispensing alkali-metal and alkaline-earth-metal cyanodithioimidocarbonates, especially when they are not to be used within short periods, it is desirable to incorporate an antioxidant or reducing agent into the solutions as well as in dry compositions in small amounts not exceeding approximately 5 percent by weight of the cyanodithioimidocarbonate. Suitable antioxidants are sulfur dioxide, sodium sulfite, sodium bisulfite, sodium thiosulfate, and sodium sulfide. Since the barium and alkaline-earth-metal salts are less hydroscopic than and not as susceptible to hydrolysis and decomposition as the alkali-metal salts, the antioxidants may be omitted entirely from the dry solid compositions of this invention which contain such alkaline-earth-metal salts or be used in smaller quantities.

Amines, such as ethylenediamine and ethanolamine, may also be added in amounts not substantially in excess of approximately 2 percent by weight of the cyanodithioimidocarbonate, to such solutions in which they act as stabilizers and retard the development of turbidity in the solutions. An aqueous solution comprising approximately 20 percent by weight of sodium cyanodithioimidocarbonate and containing sulfur dioxide in an amount calculated as sodium sulfite of approximately 2 percent by weight of the composition, which has a substantial shelf life and loses little of its microbiocidal activity over long periods, represents a preferred composition for use in the practice of the precesses of the present invention.

Solutions containing a cyanodithioimidocarbonate and ethylenediamine or other diaminoalkane having fewer than six carbon atoms, in which the amino substituent radicals are on adjacent carbon atoms, are claimed in the application of John D. Pera, Serial No. 615,102, filed October 10, 1956, which issued as patent on even date herewith. Such compositions as described therein are particularly adapted and preferred for use for the control of slime in papermaking operations in which the aqueous fluids have pH values substantially above 5.5.

Salts of cyanodithioimidocarbonic acid with metals other than those of the alkalies and alkaline earths are formed by the reaction of water-soluble salts of these metals and water-soluble salts of cyanodithioimidocarbonic acid. Although salts of heavy metals such as those of mercury, copper, silver, zinc, and iron have been prepared by us, their insolubility, instability, and inceased cost make them less desirable than the alkali and alkaline-earth-metal salts for use in the processes of the present invention. Compounds resulting from alkylation with methyl iodide and benzyl chloride have been found not to possess any substantial advantages over the water-soluble salts.

In using the processes of the present invention for control of slime in papermaking operations, an aqueous solution containing approximately 20 percent by weight of an alkali-metal or alkaline-earth-metal salt of cyanodithioimidocarbonic acid and containing the sulfite or other stabilizer is added in such amounts as to maintain a concentration of approximately 1 to 3 parts per million (p.p.m.) or greater of the solution in the pulp or furnish and circulating waters associated therewith. These additions may be made at any of the units or machines involved in the process, for example, at the beaters or to the complete furnish or even at the Fourdrinier headbox, but the addition is preferably made at a location close to the paper machine proper. It is advantageous to recycle and reuse the white waters, since they contain significant proportions of fiber and other furnish components, as well as heat and a portion of the toxicant, all of which should be conserved. This can only be accomplished by adequate control of slime, since closed systems, in which the maximum amount of white water is recirculated, present slime control problems of increased difficulty. These problems probably are attributable to the increased amount of soluble nutrient materials, particularly those in the form of sugars, which accumulate therein, and also to its higher temperature, both of which are generally more favorable to growth of microorganisms.

The compositions of the present invention have optimum effectiveness at pH values below approximately 5.5. When used at higher pH values, an inversion occurs, that is, whereas dilute solutions are rapidly lethal, slightly stronger but still dilute solutions are quite compatible with vigorous growth, and still stronger solutions may be lethal again, as indicated in Example 2 hereinafter. Although such inversion phenomena are referred to as being "exceedingly rare," by Adrien Albert (in "Selective Toxicity," New York, John Wiley & Sons, Inc., 1951, pages 126 to 128), they are observed in the use of dilute solutions of 8-quinolinol, and with other organic sulfur compounds such as tetramethylthiuram monosulfide, acting on fungal spores (H. B. S. Montgomery and H. Shaw, Nature, 1943, vol. 151, page 333), and dilute solutions of sodium dimethyldithiocarbonate acting on spores of Aspergillus niger (A. K. Sijpesteyn and G. J. M. van der Kerk, Biochimica et Biophysica Acta, 1954, vol. 15, pages 69 to 77).

In the examples which follow, which are to be regarded as illustrative rather than limitative, are described results obtained in commercial papermaking processes as well as in tests by the pulp-substrate test method. Descriptions of the preparation of compositions containing the specified water-soluble salts of cyanodithioimidocarbonic acid are also included in these examples.

The pulp-substrate test method, which is described in the article by John W. Appling, N. Jean Ridenour, and Stanley J. Buckman, published in Tappi, August 1951, vol. 34, No. 8, pages 347 to 352, beginning at page 350, simulates the conditions prevailing during actual papermaking operations, that is, those existing in a simple furnish for papermaking. In order that results of such test methods be significant and be reproducible and comparable directly with results obtained by the use of other toxicants, it is necessary to conduct them with pure cultures of single microorganisms, although in actual industrial operations the contamination which produces deterioration of the pulp or other organic matter, and formation of slime, is generally more complex and is invariably the result of the growth and deleterious action of more than one species of microorganism. Nonetheless, such tests with pure cultures are severe and are a method of obtaining a comparative evaluation of the effectiveness of agents for use in the prevention and control of contamination by microorganisms generally encountered in industrial operations, especially in the production of pulp and paper.

The pulp-substrate tests referred to in the following examples were conducted upon a pulp substrate that consisted of a sterile aqueous slurry of spruce groundwood containing 1 percent by weight (dry basis) of wood fibers. The substrate and its inoculation with a suspension of the test organism was completed by adding, to Pyrex 180-ml. milk dilution bottles fitted with Escher rubber stoppers, aliquot 40-gram portions of the substrate, and after sterilizing the bottles and their contents, adding to each the following substances in the following order:

(1) Sterile distilled water that is required in each individual case to bring the total weight of the contents of each bottle to 50 grams, after all subsequent additions specified hereinafter (including inoculation with the aqueous suspension of test organism) have been made.

(2) One milliliter of a 2.0-percent-by-weight-sterile solution of rosin size. Rosin size is the pasty sodium soap of rosin containing approximately 20 to 30 percent free rosin and 30 percent water. A suitable rosin size is that known as rosin size 70 D made by Papermakers' Chemical Department, Hercules Powder Co., Kalamazoo, Michigan.

(3) Solution of toxicant or control agent to be evaluated in such individual volumes as give the concentration desired in each test; the amount is computed in parts per million by weight.

(4a) Sterile solution of alum in an amount that has been predetermined to produce a pH between 5.0 and 5.5. This solution is generally one containing 0.4 gram of hydrated papermakers' alum $(Al_2(SO_4)_3 \cdot 18H_2O)$ per 100 grams, or alternatively, the following (4b):

(4b) Sterile solutions of buffer salts to adjust the substrate to other pH values, if required, as described hereinafter.

(5) Inoculum consisting of 1 milliliter of an aqueous suspension of the test organism. *Aerobacter aerogenes* was used in all tests, complemented in some with *Pseudomonas aeruginosa*.

In cases where buffer salts were added (4b above), they were added in the form of an undiluted mixture of 0.2-molar solutions in an amount of 5 milliliters. These buffer mixtures were each prepared by mixing the quantities of each of the 0.2-molar solutions that are specified in standard published buffer tables to obtain mixtures having the desired pH. Although, by adding 5 milliliters of such undiluted buffer mixtures to each pulp-substrate sample, each contained only a fraction (⅓ or less) of the quantity of the buffer salts that would be present in the standard buffer mixture at that concentration, this was immaterial, since the pH of a buffer mixture does not change substantially on dilution, and the quantities of buffer salts present in each of the pulp substrates were in the correct proportions to each other. The pH values of the resulting buffered pulp substrates were also checked electrometrically.

The buffer mixtures used for covering the various pH ranges specified in the examples were prepared from the following solutions:

pH 4.0 to 5.0   0.2 M solutions of (1) potassium acid phthalate and (2) sodium hydroxide.

pH 6.0 to 8.0   0.2 M solutions of (1) monopotassium phosphate and (2) sodium hydroxide.

pH 8.0 to 10.0   0.2 M solutions of (1) boric acid and potassium chloride (each in 0.2 M concentration) and (2) sodium hydroxide.

The buffer mixtures that were used are those which are commonly referred to as Clark and Lubs' Buffer Mixtures, for whose exact compositions, tables should be consulted (see, for example, that in Snell and Snell, "Colorimetric Methods of Analysis," D. Van Nostrand Co., New York, 1948, third ed., vol. I, pages 170–177).

After the inoculant suspensions of the test organisms had been added to the bottles, they were allowed to stand for periods of 6 hours and 20 hours, respectively, at an incubation temperature of 37° C., at each of which times a portion of the pulp culture was withdrawn, diluted and plated on a nutrient agar medium and incubated for 48 hours at 37° C. The number of colonies on each plate was counted and this count was converted to the number of colonies per milliliter of substrate.

From these data, the percentage kills were calculated as described in the article in Tappi referred to hereinbefore. The difference between the count for the control substrate (with no toxicant) and the count obtained from the substrate containing toxicant is divided by the count for the control substrate to give the fraction killed, which is then converted to "percentage killed" by multiplication by 100. These results are specified in the examples as percentage kills. A percentage kill of 80 percent or higher represents an extremely useful composition, and it does not follow that higher kills are necessarily better or more desirable. Most of the results in the examples are reported as ranges of concentrations used and each of the ranges of "kills" obtained at two different contact periods (6 hours and 20 hours). These ranges are based on and include a plurality of results obtained between the specified ranges.

*Example 1.—Sodium-potassium cyanodithioimidocarbonate*

A mixture of 16.6 grams of monosodium cyanamide (85 percent), 15.2 grams of potassium hydroxide (85 percent), and 17.8 grams of carbon disulfide in 160 milliliters of water was stirred and maintained at 40° C. until all the carbon disulfide had dissolved, which occurred after approximately 2 hours. The resulting red-orange 20-percent (by weight) solution of the double salt, sodium-potassium cyanodithioimidocarbonate thus formed, was tested in pulp substrate against *Aerobacter aerogenes* in accordance with the procedure described hereinbefore with the following results:

| Bacterium | Concentration of sodium-potassium cyanodithioimidocarbonate, parts per million | pH | Percentage kill | |
|---|---|---|---|---|
| | | | 6 hr. contact | 20 hr. contact |
| Aerobacter aerogenes | 1 to 10 | 5.0 | 86 to 98 | 97 to 99 |
| Same | 5 to 10 | 8.1 | 80 to 94 | 62 to 72 |

*Example 2.—Disodium cyanodithioimidocarbonate*

A mixture of 18.6 grams of monosodium cyanamide (85 percent), 10.2 grams of pelleted sodium hydroxide and 18.8 grams of carbon disulfide in 160 milliliters of water was stirred and maintained at 40° C. until all the carbon disulfide had dissolved, which occurred after approximately 2 hours. The resulting red-orange 20-percent (by weight) solution of disodium cyanodithioimidocarbonate was tested in pulp substrate against the two bacteria specified and in the manner described hereinbefore with the following results:

| Bacteria | Concentration of di-sodium cyanodithioimidocarbonate, parts per million | pH | Percentage kill | |
|---|---|---|---|---|
| | | | 6 hr. contact | 20 hr. contact |
| Aerobacter aerogenes | 0.4 to 10 | 5.0 | 84 to 99 | 99 |
| Same | 4 to 10 | 8.5 | 55 to 92 | 30 to 84 |
| Pseudomonas aeruginosa | 2 to 10 | 5.0 | 77 to 88 | 98 to 99 |
| Same | 2 to 10 | 9.0 | 0 to 41 | 24 to 77 |

Another series of pulp-substrate tests of this substance (prepared, however, by the method disclosed in Example 4 hereinafter) with *Pseudomonas aeruginosa* at pH values of respectively 6.5 and 7.5 was conducted at contact times of approximately 20 hours. The results were as follows:

| Concentration of sodium cyanodithioimidocarbonate, parts per million | Percentage kill | |
|---|---|---|
| | pH 6.5 | pH 7.5 |
| 0.1 | 15.3 | |
| 0.2 | 41.0 | |
| 0.4 | 87.9 | |
| 0.6 | 95.2 | 9.5 |
| 1 | 92.5 | 10.5 |
| 2 | 94.3 | 19.3 |
| 4 | 32.3 | 29.5 |
| 6 | | 29.5 |
| 10 | | 51.3 |
| 16 | | 8.0 |

In the foregoing results it is to be noted that, as the concentration is increased, the respective percentage kills progressively increase and a concentration is subsequently reached in each case at which the percentage kills drop. The foregoing results also indicate that, beyond a pH of approximately 5.5, the percentage kills at these low concentrations of the cyanodithioimidocarbonate become definitely smaller with increasing pH.

*Example 3.—Calcium cyanodithioimidocarbonate*

A mixture of 35.4 grams of calcium cyanamide (58 percent) and 19.5 grams of carbon disulfide in 160 milliliters of water was stirred and maintained at 40 to 45° C. until the carbon disulfide was dissolved. The reaction mixture was filtered and the resulting deep-yellow-color filtrate containing 14.4 percent of calcium cyanodithioimidocarbonate by weight was tested in pulp substrate against the bacterium specified with the following results:

| Bacterium | Concentration of calcium cyanodithioimidocarbonate, parts per million | pH | Percentage kill 20 hr. contact |
|---|---|---|---|
| Aerobacter aerogenes | 0.2 to 5 | 5.0 | 98 to 99.8 |
| Same | 2 to 10 | 8.2 | 84 to 99.9 |

*Example 4.—Disodium cyanodithioimidocarbonate*

A mixture of 350 lb. of calcium cyanamide (58 percent) and 190 lb. of carbon disulfide in 1400 lb. of water was stirred and maintained at 40 to 45° C. until the carbon disulfide had dissolved. The reaction mixture was then treated with 250 lb. of sodium carbonate and the mixture was filtered to remove undissolved impurities and precipitated calcium carbonate. The deep-yellow-colored filtrate containing 22 percent by weight of disodium cyanodithioimidocarbonate was tested in pulp substrate against the bacterium *Aerobacter aerogenes* with the following results:

| Bacterium | Concentration of disodium cyanodithioimidocarbonate, parts per million | pH | Percentage kill 20 hr. contact |
|---|---|---|---|
| Aerobacter aerogenes | 0.2 to 2 | 5.0 | 99.0 to 99.5 |
| Same | 4 to 10 | 8.2 | 86.0 to 99.8 |

*Example 5.—Barium cyanodithioimidocarbonate*

A solution containing 10 grams of the double sodium-potassium cyanodithioimidocarbonate salt as prepared in Example 1, in 190 grams of water, was treated with dilute hydrochloric acid to reduce its pH to between 7.5 and 8.0. Sixty-five (65) grams of a solution containing 15 grams of barium chloride dihydrate ($BaCl_2$—$2H_2O$) was added and the mixture treated with acetone. On standing, white crystalline barium cyanodithioimidocarbonate precipitated. When this solid was filtered, washed, and dried, it was tested in pulp substrate. The results obtained with *Aerobacter aerogenes* were as follows:

| Bacterium | Concentration of barium cyanodithioimidocarbonate, parts per million | pH | Percentage kill | |
|---|---|---|---|---|
| | | | 4 hr. contact | 20 hr. contract |
| Aerobacter aerogenes | 1 to 10 | 5.0 | | 95 to 99 |
| Same | 2 to 10 | 6.7 | 33 to 87 | 27 to 96 |
| Same | 2 to 10 | 8.6 | 70 to 93 | |
| Same | 6 to 10 | 8.6 | | 75 to 99 |

*Example 6.—Sodium-potassium cyanodithioimidocarbonate*

Similarly to the preparation in Example 1, a solution containing 84.4 grams of monosodium cyanamide (85 percent), 130.4 grams of aqueous potassium hydroxide solution (48.2 percent KOH), and 680 grams of water was treated with 85.4 grams of carbon disulfide at 40° C. for 2 hours. Twenty (20) grams of anhydrous sodium sulfite was then added and the resulting stable solution contained 20 percent by weight of sodium-potassium cyanodithioimidocarbonate double salt. When such a solution was fed continuously to a papermill system in which the operating pH was 5.5 or lower at a rate between 1 to 5 p.p.m (0.2 to 1 p.p.m. of active ingredient) based on the weight of water and fiber moving through the system, slime accretion was inhibited to such an extent that the paper machines remained in operation without shutdowns specifically for cleaning to remove slime and such cleaning as was necessary was accomplished during the usual periodic down times (varying from 7 to 20 days) for mechanical repairs and changing of machine clothing (wires and felts, etc.). The treatment in this case was equally as effective as that provided by use of organomercurial compounds, but the toxicant, unlike the organomercurials, was not retained in the paper products.

*Example 7.—Sodium-potassium cyanodithioimidocarbonate*

The addition of 0.2 to 0.4 part per million (based on the furnish as a whole) of sodium-potassium cyanodithioimidocarbonate prepared as described in Example 1 effectively controlled the growth of slime in a paper mill manufacturing food container board. The toxicant was added as a 20-percent aqueous solution containing 2 percent of sodium sulfite and the addition was made into the shower water of the cylinder-type paper machine. The operating pH of this system was between 5.5 and 7.5.

The growth and proliferation of microorganisms were controlled to such degree that no substantial slime accretions occurred and no unscheduled shutdowns were necessary for cleaning to remove slime. The odor levels in the mill and in the finished paperboard were also reduced so that a larger portion of the production of the mill could be sold without customer complaints with respect to objectionable odors. The bacterial populations in the finished paperboards were reduced to levels which met or were lower than those prescribed in public health regulations.

Although it was expected that use of the toxicant in this pH range would have been unsatisfactory, based on the laboratory pup-substrate tests, the differences noted were attributed to differences in the stocks treated, namely, the difference between groundwood pulp used in the tests and paperboard stock, which is a stock produced from waste paper that had been subjected to repeated washings in prior papermaking operations.

*Example 8.—Sodium-potassium cyanodithioimidocarbonate*

The addition of 0.4 part per million (based on the furnish as a whole) of sodium-potassium cyanodithioimidocarbonate prepared as described in Example 1 effectively eliminated a so-called "pink slime" infection caused by bacteria within a week in a paper mill manufacturing high-grade printing paper. The toxicant was added as a 20-percent aqueous solution containing 2 percent of sodium sulfite and the addition was made in a continuous manner at the suction side of the fan pump of the paper machine. The operating pH of this system was between 4.0 and 4.5.

*Example 9.—Sodium-potassium cyanodithioimidocarbonate*

The addition of 0.6 to 0.8 part per million (based on the furnish as a whole) of sodium-potassium cyanodithioimidocarbonate prepared as described in Example 1 effectively controlled the growth of slime in a paper machine manufacturing paper towels and paper tissue of high wet strength. The toxicant was added as a 20-percent aqueous solution containing 2 percent of sodium sulfite and the addition was made intermittently at the pulper. This system was operating at a pH between 4.0 and 4.2.

*Example 10.—Sodium-potassium cyanodithioimidocarbonate*

The addition of 0.2 to 2 parts per million of sodium-potassium cyanodithioimidocarbonate prepared as described in Example 1 to tap water samples buffered respectively at pH 5.1 with sodium hydroxide and potassium acid phthalate, and pH 6.2 with sodium hydroxide and potassium dihydrogen phosphate, produced environments in which high percentage kills of *Aerobacter aerogenes* were obtained after a contact period of 20 hr. The data obtained in one such series were as follows:

| Bacterium | Concentration of sodium-potassium cyanodithioimidocarbonate, parts per million | pH | Percentage kill 20 hr. contact |
|---|---|---|---|
| Aerobacter aerogenes | 0.2 to 2.0 | 5.1 | 27 to 99 |
| Same | 0.2 to 2.0 | 6.2 | 63 to 91 |

The above environment simulates closely that of industrial cooling waters, the microflora of which can be controlled by small amounts of sodium-potassium cyanodithioimidocarbonate.

The terms "alkali-metal" and "alkaline-earth-metal" have been used herein in accordance with their generally accept meaning, and include sodium, potassium, calcium, and barium as well as the other less common metals of these groups.

Inasmuch as the foregoing specification comprises preferred embodiments of the invention, which were selected merely for purposes of illustration, it is to be understood that variations and modifications may be made therein in conventional manner and in accordance with the teachings thereof, without departing from the invention or its scope as defined in the appended claims.

We claim:

1. A process of inhibiting microbiological deterioration of an organic cellulosic substance that is normally susceptible to deterioration by the action of microorganisms and inhibiting the formation of slime in aqueous fluids that are in contact with such substance, which comprises adding to the said aqueous fluid a water-soluble salt of cyanodithioimidocarbonic acid in an amount sufficient to prevent microbiological deterioration of the cellulosic substance and inhibit the formation of slime in the aqueous fluid.

2. A process as defined in claim 1 in which the water-soluble salt of cyanodithioimidocarbonic acid is an alkali-metal salt.

3. A process as defined in claim 1 in which the water-soluble salt of cyanodithioimidocarbonic acid is an alkaline-earth-metal salt.

4. A process as defined in claim 1 in which the water-soluble salt of cyanodithioimidocarbonic acid is present in an amount between approximately 0.1 and approximately 3.0 parts per million.

5. A process as defined in claim 1 in which the pH of the aqueous fluids is below approximately 5.5.

6. A process of controlling slime in pulp and paper mill systems which comprises adding to an aqueous suspension containing the pulp a water-soluble salt of cyanodithioimidocarbonic acid in an amount sufficient to prevent the formation of slime in the system.

7. In the production of paper from cellulosic pulp, the process of inhibiting the microbiological deterioration of such pulp and the formation of slime in aqueous fluids and on surfaces that are in contact with such pulp and fluids, which comprises adding to the aqueous fluids between approximately 0.1 and approximately 3.0 parts per million of a water-soluble salt of cyanodithioimidocarbonic acid.

8. An aqueous suspension of cellulosic pulp intended for use in the production of paper or paperboard which is normally susceptible to microbiological deterioration and slime formation, which contains, for the purpose of inhibiting such deterioration and slime formation, between approximately 0.1 and approximately 3.0 parts per million of a water-soluble salt of cyanodithioimidocarbonic acid.

9. A process for the production of paper from a dilute aqueous cellulosic pulp suspension, which comprises adding to the aqueous pulp suspension a water-soluble salt of cyanodithioimidocarbonic acid in such amount that microbiological deterioration of the pulp and the formation of slime on surfaces in contact with the pulp suspension are substantially inhibited, and otherwise treating the pulp in accordance with conventional papermaking procedures.

10. White water from prior papermaking operations which contains a water-soluble salt of cyanodithioimidocarbonic acid in an amount sufficient to inhibit growth of slime-forming microorganisms therein and inhibit microbiological deterioration of the pulp and nutrient substances retained therein.

11. In a process for the production of paper, the step which comprises adding to the process water a water-soluble salt of cyanodithioimidocarbonic acid in an amount sufficient to inhibit the growth of slime-forming microorganisms and microbiological deterioration of the papermaking substances therein.

12. An aqueous suspension of cellulosic pulp intended for use in the production of paper which is normally susceptible to microbiological deterioration and slime formation which contains, for the purpose of inhibiting such deterioration and slime formation, a water-soluble salt of cyanodithioimidocarbonic acid.

References Cited in the file of this patent
UNITED STATES PATENTS

| | | |
|---|---|---|
| 1,972,961 | Tisdale | Sept. 11, 1934 |
| 2,588,428 | Stewart | Mar. 11, 1952 |

OTHER REFERENCES

Migridichian: The Chemistry of Organic Cyanogen Compounds, 1947, page 119.